Figure 1:
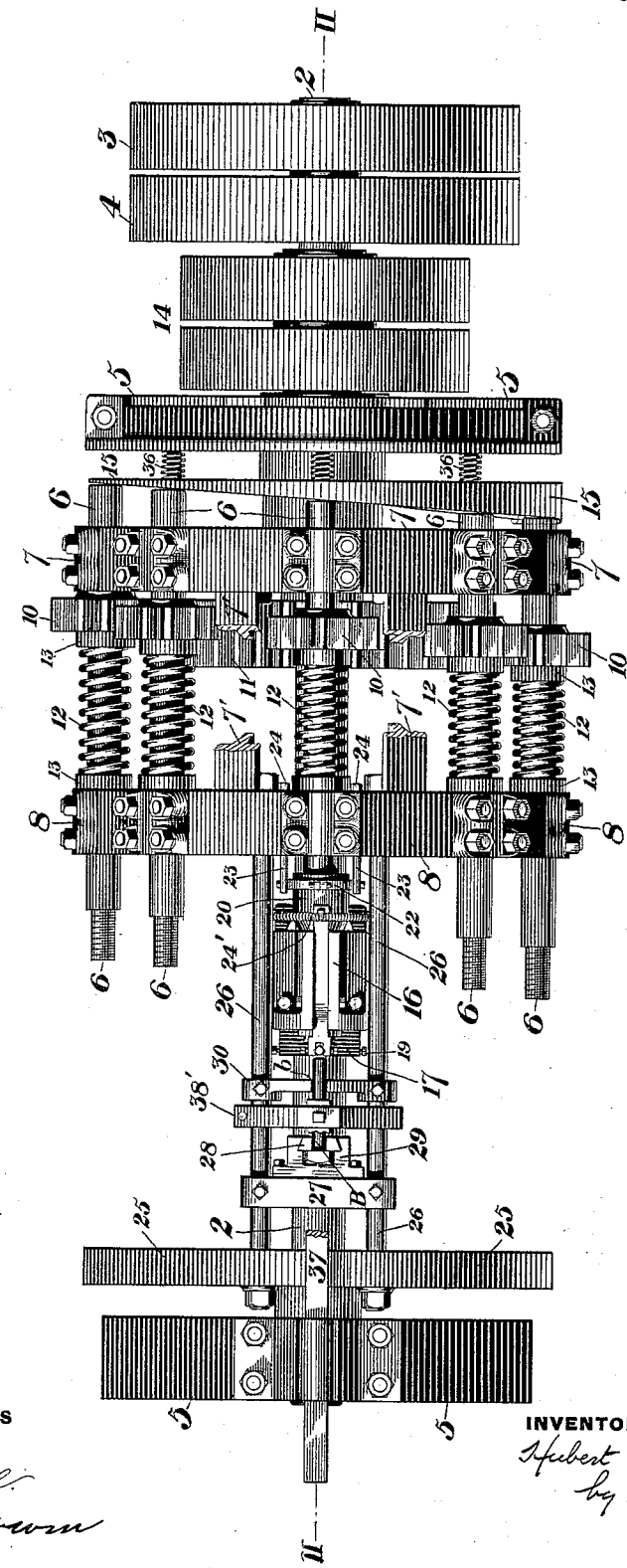

(No Model.) 3 Sheets—Sheet 1.

H. CREHAN.
SCREW CUTTING MACHINE.

No. 431,560. Patented July 8, 1890.

WITNESSES
INVENTOR

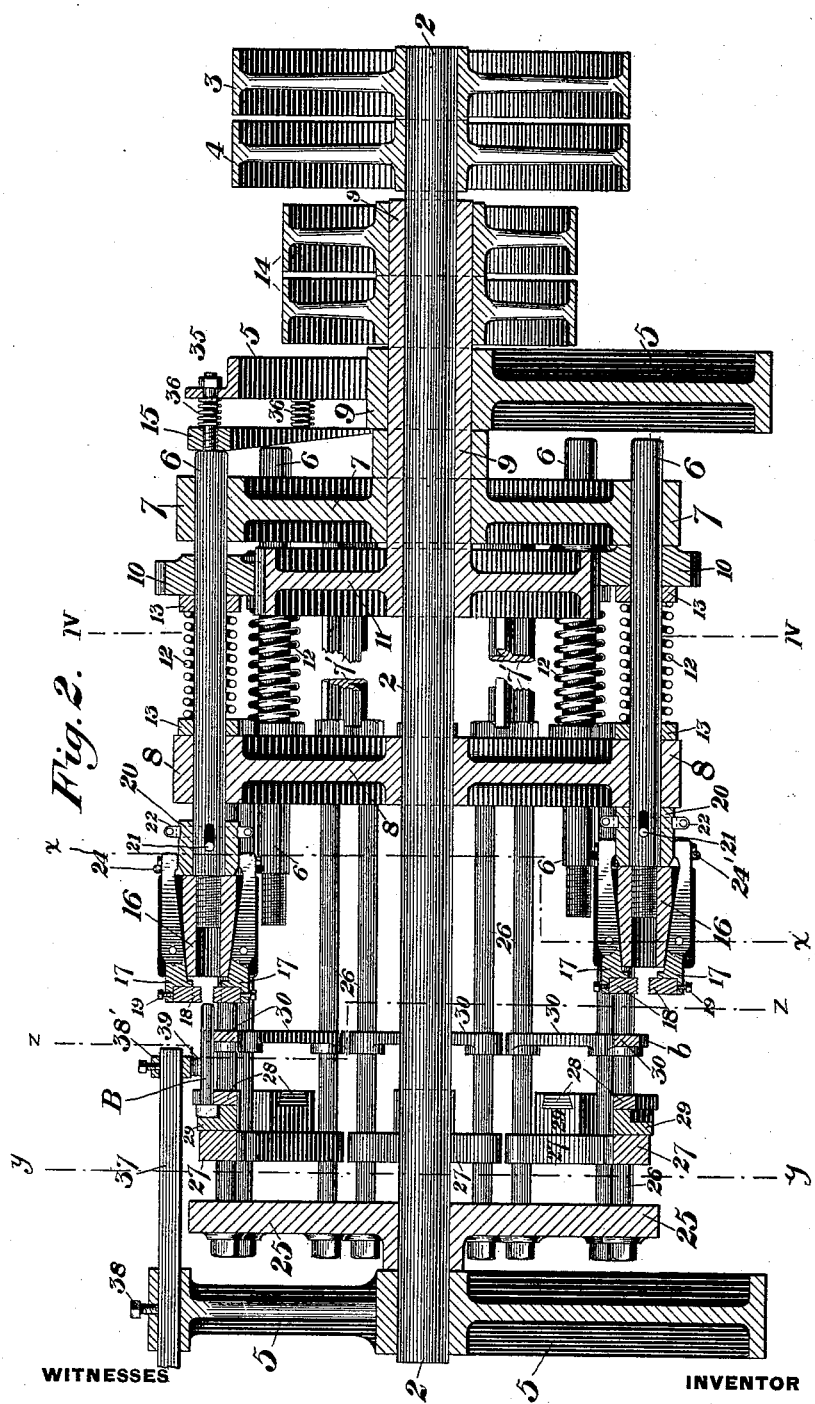

(No Model.) 3 Sheets—Sheet 3.
H. CREHAN.
SCREW CUTTING MACHINE.
No. 431,560. Patented July 8, 1890.
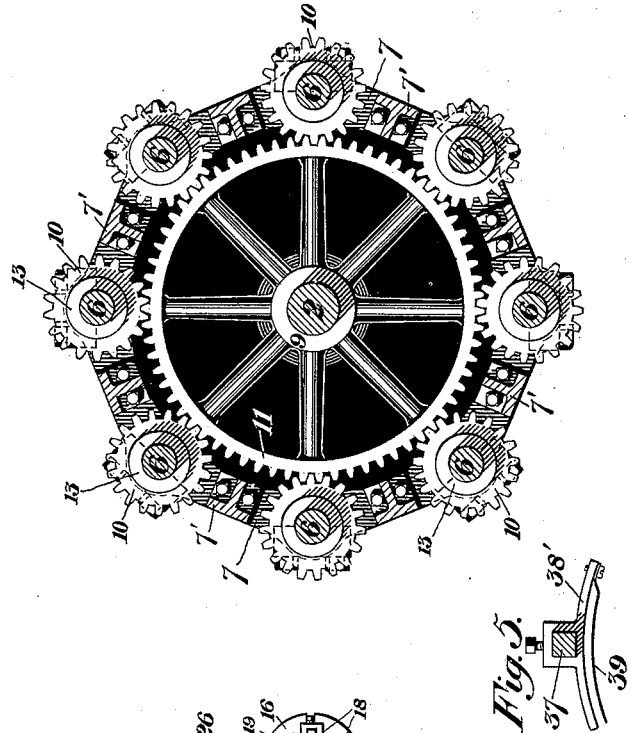
*Fig. 4.*
*Fig. 5.*
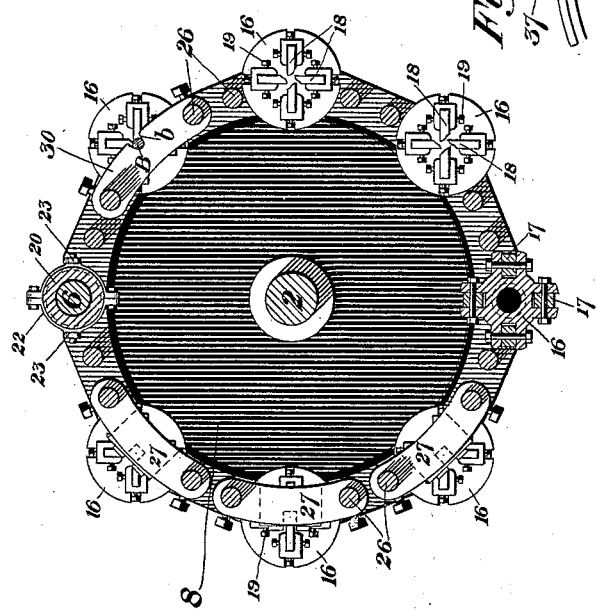
*Fig. 3.*
WITNESSES
INVENTOR

UNITED STATES PATENT OFFICE.

HUBERT CREHAN, OF PITTSBURG, PENNSYLVANIA.

SCREW-CUTTING MACHINE.

SPECIFICATION forming part of Letters Patent No. 431,560, dated July 8, 1890.

Application filed April 17, 1890. Serial No. 348,417. (No model.)

*To all whom it may concern:*

Be it known that I, HUBERT CRÉHAN, of Pittsburg, in the county of Allegheny and State of Pennsylvania, have invented a new and useful Improvement in Screw-Cutting Machines, of which the following is a full, clear, and exact description, reference being had to the accompanying drawings, forming part of this specification, in which—

Figure 1 is a plan view of my improved machine. In this figure only one of the heads for carrying the cutting-dies is shown, the others being omitted from their shafts in order that the drawings may not be confused by multiplicity of detail. Fig. 2 is a vertical longitudinal section on the line II II of Fig. 1. Fig. 3 is a vertical irregular section on the lines $x\,x, y\,y$, and $z\,z$ of Fig. 2. Fig. 4 is a vertical cross-section on the line IV IV of Fig. 2.

Like symbols of reference indicate like parts in each.

In the drawings, 2 represents the main shaft of the machine, and 3 and 4 are fast and loose pulleys for driving the shaft 2. The shaft 2 is journaled in suitable bearings in the upright frame 5 of the machine.

6 6 are the spindles which carry the cutter-heads. There is any suitable number of these spindles. I have shown eight of them in the drawings. They are journaled in bearings in projecting heads or wheels 7 8, of which the wheel 7 is journaled on the bush 9, which encircles the shaft 2, while the wheel 8 is keyed to the main shaft 2. The wheels 7 and 8 are preferably connected by tie rods or braces 7', which unite the wheels and cause them to revolve in unison.

Each of the spindles 6 is provided with a gear-wheel 10, which is keyed thereto, and the gear-wheels of the several spindles are in gear with the teeth of a pinion 11, which is loosely journaled on the shaft 2, and is preferably made integral with the bush 9, which is also loosely journaled on said shaft, so as to be capable of rotation independently thereof.

12 12 are springs interposed between the sides of the gear-wheels 10 and the opposing face of the wheel 8. These springs encircle the several spindles 6, and are preferably provided with collars 13, interposed between the ends of the springs and the surfaces against which they exert their force. The bush 9 and the wheel 11 are adapted to be rotated independently of the shaft 2 by means of fast and loose belt-pulleys 14. The spindles 6 are from their construction adapted to be moved longitudinally in their bearings, and for the purpose of imparting such motion thereto a cam ring or plate 15 is fixed to one of the uprights 5 of the machine-frame and is designed to bear against the ends of the spindles in the revolution around the axis of the shaft 2. As the ends of the spindles approach the prominent portion of the cam-ring and when they reach the abrupt end thereof, they are in position to be retracted suddenly by means of the back-pressure of the springs 12. At the end of each spindle 6 is secured a head 16, which carries the jaws 17 of the cutters. These jaws are severally pivoted between projecting wings of the head 16, as shown in the sectional views, Figs. 2 and 3, and each is provided with an arm extending to the rear of the head, and with a second arm, preferably shorter, projecting to the front thereof and constituting a socket for holding the cutting-die 18, which is secured in said socket by means of set-screws 19. There may be any suitable number of the cutting-dies arranged in each head. In the drawings I show each head provided with four cutting dies or jaws.

The jaws 17 are adapted to be opened and closed by the following means: On each of the spindles 6 is a collar 20 mounted thereon, so as to be capable of independent longitudinal motion, but keyed to the shaft by a pin 21, passing through a slot in the spindle, so that the collar shall revolve with the spindle in the rotation of the latter. The end of each collar 20 next to the head 16 is made conical or tapering in form, and at the rear end each collar is connected with the wheel 8 by loose sleeves 22, provided with rods 23, (shown in Fig. 1,) which extend through holes in the wheel 8, and are provided at their inner ends with nuts or heads 24, so that by the restraining action of these rods the collar is permitted only a limited forward motion with the spindle. The lower one of the two spindles shown in Fig. 2 is in its most retracted position, and the jaws 17 on the cutter-head are closed by reason of the contact of the collar 20 with the inner sides of the rear ends of the jaws. As the main shaft 2 revolves and carries the spindles 6 around its axis, the ends of the spindles in succession come in contact with the cam-ring 15, and as they travel along this cam-ring the spindles are moved forward lengthwise in their bearings by the action thereof, the effect of this being to feed forward the cutting-heads upon the bolts, the several spindles meanwhile being rotated on their own axes by the rotation of the pinion 11. The upper one of the two spindles shown in Fig. 2 is illustrated as having moved forward nearly one-half of the stroke imparted by the action of the cam-ring 15. During such motion the collar 20 on the spindle is moved with the latter, being carried therewith by reason of the friction exerted on the collar by the ends of the jaws 17. As the cam-ring continues to force forward the spindle, the collar 20 is restrained from further motion therewith by the rods 23, so that thenceforth the heads 16 and the jaws 17 move independently of and away from the collar. At the end of the forward motion of the spindle the rear ends of the jaws 17, having reached the conical or tapering portion of the collar 20, are forced inwardly by a suitable annular spring or springs 24'. This causes the outer ends of the jaws to diverge and to release the cutting-bits from the bolt, which, being at this time preferably at the side of the machine, drops out of its holder and from the dies. The spindle 6 at this time reaches the end of the cam-ring 15, and its end being released therefrom the spindle is forced back by the spring 12 into the position shown at the lower part of Fig. 2, the jaws 17 being again closed by the mounting of the rear ends thereof upon the circumference of the collar 20. The cam-ring 15 is preferably about two-thirds of a circle in extent, and each of the cutter-heads is subjected to the several actions above described—once for each revolution of the main shaft 2. The spindles 6 are revolved on their own axes much more rapidly than the main shaft, the relative speed of revolution being dependent upon the number of threads to the inch to be cut on the bolt, as will be readily understood by those skilled in the art. The revolution of the main shaft effects the feeding of the dies to the bolts and the release of the bolts from the dies. The independent revolution of the spindles by turning the cutter-heads effects the actual cutting of the screw-threads on the bolts. Instead of securing the cam-ring 15 rigidly to the frame 5, I prefer to arrange it as shown in Fig. 2, the ring being provided with bolts 35, which extend back through holes in the frame 5 and with interposed springs 36. The effect of this construction is that if the adjustment of the machine be not exact, and if the action of the cam-face would force the spindles 6 too rapidly forward for the proper action of the cutting-dies, the springs 36 will yield somewhat, and thus prevent the cutting-dies from stripping the thread from the bolt.

I shall now describe the means which I employ for holding the bolts during the cutting operation. 25 is a head or wheel keyed to the main shaft 2 and connected with the wheel 8 by tie-rods 26, which tie-rods serve as supports for the carriages or bolt-holders. These holders 27 consist of metal bars or plates set on the rods 26, as shown in Figs. 1, 2, and 3, and on the inner side of each holder is bolted a block 28 29, which is vertically slotted, the size and shape of the slot being such as to receive and neatly hold the square portion of the bolt next to the head. In advance of each holder is a transverse guide 30, having in the middle portion a notch or slot b, on which the shank of the bolt rests, and by which the bolt is centered and held in proper position with relation to the cutting-dies. 37 is a rod which projects from the frame of the machine, to which it is preferably secured by a set-bolt 38, so as to permit it to be longitudinally adjustable. 38' is an arm which is mounted on the rod 37, which carries a spring 39, situated directly opposite to the position in which the bolts are when they are engaged by the cutters. The arm 38' is preferably adjustable with the rod 37, and for this purpose is secured thereto by a set-bolt.

In the operation of the machine the operator stands at the side of the machine near the beginning of the cam-ring 15, and as the spindles in succession approach this cam-ring he inserts a bolt B in the bolt-holder block 28. The bolts are then carried with the spindles around the axis of the shaft 2, and as the spindles are pushed forward by the cam-ring, as shown in Fig. 2, the cutters engage the bolt, and the revolution of the spindle, by revolving cutters around the bolt, forms the thread on the latter. When the bolts are successively brought into the position where they are engaged by the cutters, they engage the spring 39, which bears against them with a yielding pressure, holds them when they are first engaged by the cutters, and prevents them from being displaced thereby from the holders. In a machine having eight cutter-heads, as shown in the drawings, eight bolts may be threaded at each revolution of the main shaft, and as the machine is easy to manage and to feed its operation is very rapid.

The advantages of my improvement will be appreciated by those skilled in the art.

The machine is simple in construction, rapid in action, requires little attendance, and is very durable.

The construction of the several parts may be varied in many ways by the skilled mechanic.

The construction of the machine by which the spindles are caused to travel with planetary motion around the main shaft and to revolve on their own axes, these motions being effected independently, is of peculiar advantage in respect of the setting and adjusting of the dies when the spindles are caused to revolve without revolving the main frame in which they are carried. I am thus enabled to rotate the spindles on their own axes at a relatively high rate of speed and to effect the complete cutting of the bolt in a partial revolution of the main shaft, and so that the bolt, when completely cut, will drop out of the holder automatically, instead of being held thereby until it is removed by hand.

There is also an especial advantage in that construction of the machine by which, instead of feeding the bolts forward to the cutters, the cutters are fed forward to the bolts, since I secure thereby certainty and accuracy in the operation of the parts.

I claim—

1. In a machine for cutting screw-threads, the combination of a bolt-holder, a rotary cutter which is longitudinally movable to the bolt, and means for so moving the cutter, substantially as and for the purposes described.

2. In a machine for cutting screw-threads, the combination of a rotary frame, spindles journaled therein, and independent means for rotating the spindles on their individual axes, substantially as and for the purposes described.

3. In a machine for cutting screw-threads, the combination of a rotary frame, spindles journaled therein, means for rotating the spindles on their individual axes, cutters carried by the spindles, and means for advancing the spindles, substantially as and for the purposes described.

4. In a machine for cutting screw-threads, the combination of a central shaft, a frame rotary thereon, spindles carried by the frame, gear-wheels on the spindles, and a central pinion in gear with the said gear-wheels and adapted to rotate the same, substantially as and for the purposes described.

5. In a machine for cutting screw-threads, the combination of a rotary frame, spindles journaled therein, independent means for rotating the spindles on their individual axes, bolt-holders carried by the frame, and cutters on the spindles, substantially as and for the purposes described.

6. In a machine for cutting screw-threads, the combination of a rotary frame, spindles journaled therein, means for rotating the spindles on their individual axes, and a cam which bears on the spindles and projects them, substantially as and for the purposes described.

7. In a machine for cutting screw-threads, the combination of a rotary frame, spindles journaled therein, means for rotating the spindles on their individual axes, pivoted cutters on the spindles, means for advancing the spindles, and cams movable with the spindles but provided with restraining devices, by which a limited motion only is permitted thereto, whereby on the restraint of motion of the cams the cutters are actuated, substantially as and for the purposes described.

8. In a machine for cutting screw-threads, the combination of a rotary frame, spindles journaled therein, means for rotating the spindles on their individual axes, and a spring-backed cam which bears on the spindles and projects them, substantially as and for the purposes described.

9. In a machine for cutting screw-threads, the combination, with a rotary frame and cutters, of bolt-holders having cavities for receiving the bolts, with angular portions by which the heads are held and the bolts prevented from turning, substantially as and for the purposes described.

10. In a machine for cutting screw-threads, the combination of a rotary frame comprising rotary portions 8 and 25, tie-rods 26, connecting these parts, and bolt-holders 30, mounted on said tie-rods, substantially as and for the purposes described.

11. In a machine for cutting screw-threads, the combination of a rotary frame having bolt-holders, cutters rotary with the frame and movable to engage the bolts, and a yielding holder which bears against the bolts at the time of the engagement of the cutters therewith, substantially as and for the purposes described.

12. In a machine for cutting screw-threads, the combination of the main shaft, the spindles, the independently-rotatory pinion 11 for rotating the spindles, and the bush or sleeve 9, mounted on the main shaft and connected with the pinions for transmitting such independent rotation, substantially as and for the purposes described.

13. In a machine for cutting screw-threads, the combination of a rotary frame, spindles journaled therein, means for rotating the spindles on their individual axes, cutters mounted on the spindles, mechanism which on a certain projection of the spindles separates the cutters, and a cam for projecting the spindles, said cam being so shaped relatively to the rotation of the frame as to cause the separation of the cutters at the termination of the thread-cutting operation, substantially as and for the purposes described.

14. The combination of the rotary frame, spindles carried thereby, a cam bearing on the spindles for projecting them, cutter-arms on the spindles, tapering sleeves mounted on the spindles and capable of slight longitudinal motion thereon and bearing on the cutters, and restraining devices by which the motion of the sleeves may be checked, substantially as and for the purposes described.

In testimony whereof I have hereunto set my hand this 28th day of March, A. D. 1890.

HUBERT CREHAN.

Witnesses:
 W. B. CORWIN,
 JNO. K. SMITH.